United States Patent Office 2,729,908
Patented Jan. 10, 1956

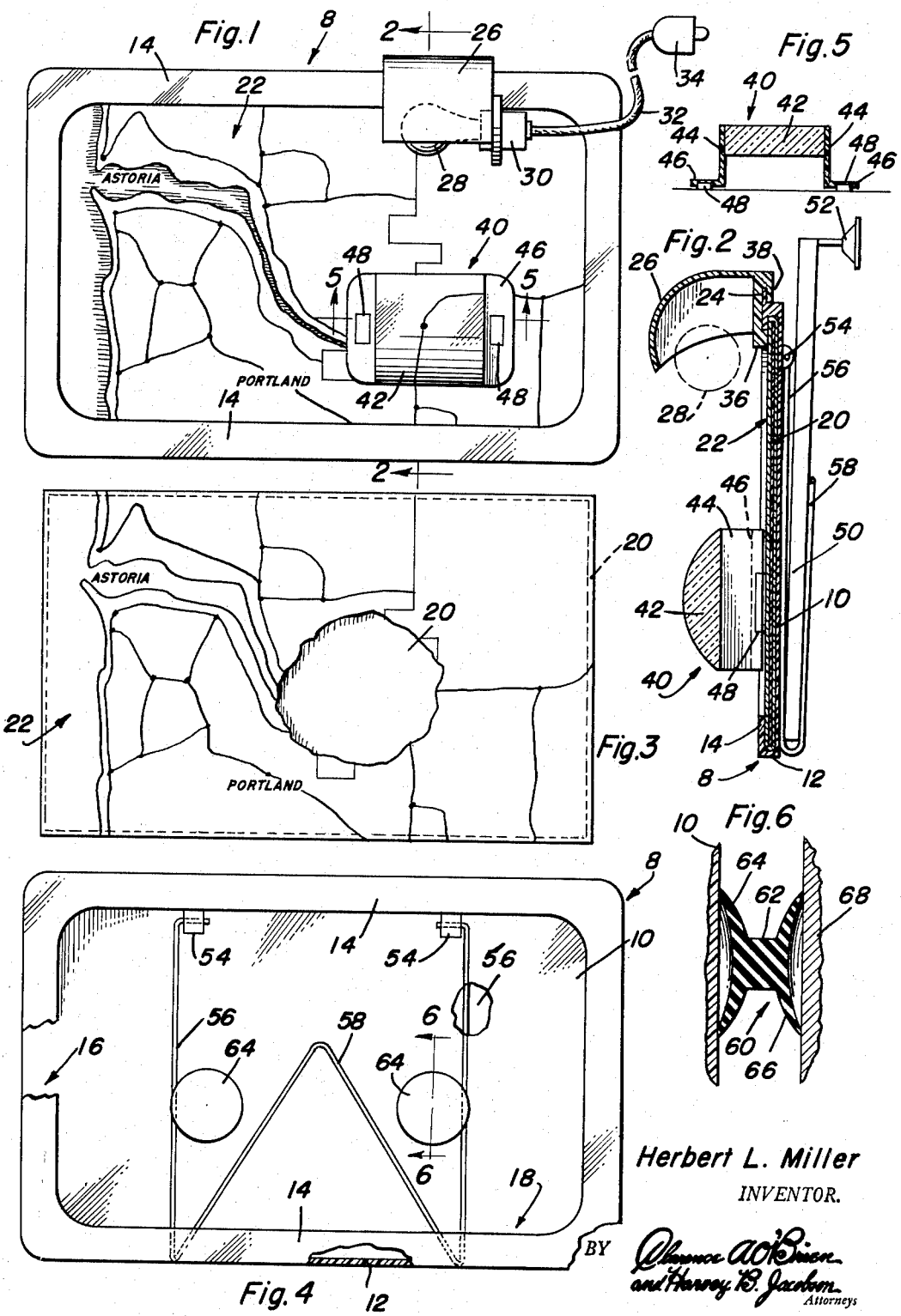

2,729,908

COMBINED MAP ANTIGLARE SHIELD AND MAGNIFYING GLASS

Herbert L. Miller, Portland, Oreg.

Application May 28, 1951, Serial No. 228,611

2 Claims. (Cl. 40—10)

The present invention relates to automotive apparatus and accessories in general and has more particular reference to a multi-purpose device which functions as a safety glare reducing shield, a convenient holder for a road map, a source of illumination for association with the map, and a readily shiftable magnifying glass to assist the user in more easily checking and reading designations on the map.

There has long existed a recognized need for a simple, practical and convenient map holder for so-called large-size foldable paper road maps. It is not unusual for one to observe a tourist folding a relatively large map so that the section of the map in use at the time will be handily reduced to an easy-to-handle size. Therefore, one object of the instant invention is to provide a relatively small, substantially rigid rectangular plate, preferably of metal, which constitutes a form and facilitates wrapping and handily folding portions of the map thereon in a manner to assist the user in handling and making quick reference to indicia and designations commonly found on road maps.

Another object of the invention is to utilize a metal plate to which permanent magnets will adhere, despite the fact that the map is wrapped around and actually encases the plate, whereby to make it practical to incorporate such magnets in a handy magnifying glass and to appreciably assist the user in checking and reading the map at a glance.

A further object of the invention is to provide the stated form which, because of its construction, functions as a platen and which lends itself to cooperation with a transparent anti-glare shield, particularly one which is unique in that it has a receiver incorporated thereon, said receiver functioning as an efficient and practical holder for the stated platen with the map folded thereon.

Then, too, novelty is predicated on the anti-glare shield with a receiver, wherein the receiver constitutes a mount for a shiftable electric illuminating bulb and wherein said anti-glare shield is provided on one side with readily applicable and removable suction cups and on the same side with suitable bracket means which may be selectively and individually used to assist in mounting the anti-glare shield on a windshield, the instrument panel, or, whenever necessary or desired, on the usual non-transparent sun visor with which present-day automobiles are provided.

Other objects and advantages will become more readily apparent from the following description and the accompanying sheet of illustrative drawings.

In the accompanying sheet of drawings, wherein like numerals are employed to designate like parts throughout the views:

Figure 1 is a face or elevational view of a multi-purpose device showing the folded map in use and showing, in addition, the magnifying glass and its mode of use and the adjustable electric light bulb.

Figure 2 is a section taken on the vertical line 2—2 of Figure 1, looking in the direction of the arrows and showing how the device looks when it is mounted on a conventional non-transparent automobile sun visor.

Figure 3 is a plan or face elevational view which shows the folded map and its holder removed from the receiver on the anti-glare shield, a portion of the map being broken away to expose the otherwise enclosed platen or plate.

Figure 4 is a view similar to Figure 1 with the map and holder removed from the receiver, with the magnifying glass off and with the light off, and with the selectively usable attaching devices appearing through the transparent shield.

Figure 5 is a longitudinal section taken on the line 5—5 of Figure 1, said view showing only the magnifying glass.

Figure 6 is an enlarged fragmentary sectional view showing the double-acting detachable suction cups and how they function.

Referring now to the drawings by way of reference numerals and accompanying lead lines, it seems well to refer first to one of the principal or basic units in the over-all assemblage. This is the unit which is herein to be designated as the anti-glare shield. This is denoted, in a unitary sense, by the numeral 8 and it is constructed of suitable commercial plastics. There is a rectangular transparent panel 10 and this is surrounded on three marginal sides by a laterally extending rim 12 having a laterally inturned flange 14. These components 12 and 14 collaborate with the panel in defining a pocket-like receiver which is open at the left as denoted at 16. The receiver is in turn denoted by the numeral 18 and it is of general rectangular form. It will be understood that this is closed around three marginal edges and open on the side 16 so that the insert means shown in Figure 3 may be readily placed in position and removed. The insert means, as before touched upon, comprises a substantially rigid metal backing plate or platen 20 which is readily inserted or removed in relation to the pocket-like receiver 18. The metal of the plate is such as to provide desired attraction properties for permanent magnet means to be hereinafter refered to. Said plate is preferably rectangular and is so made as to permit the customary large-sized folding map 22 to be attached and removed. Some of these maps range as much as three feet or more square, and when they are opened up they are, of course, difficult to handle and read. Usually, the user of a map of this type will concentrate on a particular region or area on the map on the route which is being travelled. He will then fold the map in a well-known manner so that it will be relatively small and easy to handle. In this case, instead of folding the map wholly upon itself, the map is folded in such a way that it may be "wrapped" around the backing plate. Now the backing plate becomes a firm base for stabilizing and nicely spreading the map thereon for ready handling and use and facilitates placing the map in said pocket or removing it from the latter as the case may be. It has been found from actual practice in using a device which is experimentally in use that by using a plate which is, let us say, some six inches wide and ten inches or so in length, sufficient of the map can be spread thereon that the portion thus spread will serve the average driver for approximately five or six hours of driving time.

It will be noticed in Figure 2 that there is a flange 24 which runs across the top of the frame which surrounds the panel 10 and this flange serves as a mount for a slidable hood or hood-like shade 26 for the electric bulb 28. The bulb has a suitable supporting socket 30 and a current supply cord 32 with a fitting 34 which may be applied to the cigar lighter (not shown) which is often used on the instrument panel of many automobiles currently in use. By providing the hood with attaching elements 36 and 38, said hood may be slidably and removably mounted on the anti-glare unit 8. It often provides a convenient source of artificial illumination for driving on dark cloudy days and even during the night.

Another feature of the invention has to do with the readily applicable and removable and slidably used magnifying glass unit 40. This comprises an appropriate magnifying glass 42 with end members 44—44 having outstanding flanges 46—46 provided with embedded permanent magnets 48—48.

Reference is made now to Figure 2 wherein the numeral 50 denotes a rigid non-transparent sun visor such as is currently used on and in connection with automobiles. This is hingedly or otherwise supported on bracket means 52 in any convenient fashion. The purpose in showing this here is to acquaint the reader with the fact that the over-all device which has been described may be suspended from this sun visor 50 when said device is not in use. As a matter of fact, it may be suspended thereon when the device is in use. For example, there are usually two sun visors provided on automobiles and when they are used are swung down into parallelism with the windshield in a well-known manner. Also, it is customary for an occupant of the car riding alongside of the driver to do the map work, so to speak. Since it may be inconvenient to continually hold the map in one's lap, it is obvious that the entire device, including the map as a component part, may be attached to the sun visor in the manner shown. To accomplish this, suitable lugs 54—54 (see Figure 4) are provided, and resilient arms 56 are secured thereto. The arms are provided with a laterally bent V-shaped member 58 which constitutes an attaching hook. This is "hooked" on the sun visor 50 as shown, thus placing the map in a readily readable position on the sun visor. If desired, the magnifying device may be applied against the map surface as shown in Figure 2, and shifted about to facilitate reading designations on the map. In some instances, the device may be conveniently held in the user's lap and here the magnifying glass will "stay put." In other words, the permanent magnets 48—48 will adhere to the metal backing plate 20, despite the paper map intervening between the magnets and plate. Therefore, one phase of the invention has to do with suitable holding means, a plate, and a folded map thereon in conjunction with a shiftable magnifying glass applied and held in an established position through the aid and instrumentality of permanent magnets.

It is also desirable to provide two-way or double-acting suction cups of the type denoted at 60 in Figure 6. Here, a shank 62 joins two rubber suction cups 64 and 66. One cup is applied to the instrument panel 68 and the other cup is applied to the surface of the anti-glare shield or panel 10. This makes it possible to use the suction cups for "sticking" the device on the instrument panel. It is therefore within the purview of the invention to use suitable attaching devices for the anti-glare panel or shield.

In view of the foregoing description taken in conjunction with the accompanying drawings, it is believed that a clear understanding of the device will be quite apparent to those skilled in this art. A more detailed description is accordingly deemed unnecessary.

Minor changes in shape, size, materials, and arrangement of parts may be resorted to in actual practice without departing from the spirit and scope of the invention as claimed.

Having described the invention, what is claimed as new is:

1. A holder for a backing plate having a folded map wrapped therearound comprising, in combination, a flat transparent panel having an endless frame projecting beyond one side thereof, said frame circumscribing the entire marginal edge portions of the panel and having flanges parallel to and spaced from said one side of the panel and combining therewith in defining a receiver, said receiver being open at but one end, a rigid metal plate properly sized and fitted through said open end into the receiver and removably confined in the receiver, the dimensions of the receiver being such as to accommodate not only the plate alone but the latter after a map is completely and compactly wrapped around the plate, the complemental inner marginal edges of the respective flanges defining a sight opening exposing the principal portion of one side of the plate, the other side of the plate being visible by way of said transparent panel, a hood-like shade for a lamp bulb slidably mounted on one longitudinal edge portion of the frame so that the holder projects laterally beyond the plane of said frame, said holder shade and plate, as a unit, being suitable for placement on the user's lap when in use.

2. The structure defined in claim 1 and the combination therewith of a map reader complemental to and usable in association with said plate, said reader comprising a magnifying glass which is adapted to be placed in spaced parallelism in respect to the plate, said glass being provided with lateral end members and said end members terminating in outstanding flanges forming feet, and permanent magnets embedded in the respective feet, said thus magnetized feet being adapted to be shiftably and magnetically supported on said plate even after the map is wrapped around and thus attached to the plate.

References Cited in the file of this patent

UNITED STATES PATENTS

| 560,080 | Booher | May 12, 1896 |
| 1,609,418 | Nechamkin | Dec. 7, 1926 |
| 1,673,595 | Scoggins | June 12, 1928 |
| 1,754,851 | Dey | Apr. 15, 1930 |
| 1,773,337 | Barlow | Aug. 19, 1930 |
| 1,894,233 | Ellis | Jan. 10, 1933 |
| 2,306,174 | Mallory | Dec. 22, 1942 |
| 2,431,827 | Rado | Dec. 2, 1947 |

FOREIGN PATENTS

| 473,292 | France | Jan. 7, 1915 |
| 247,119 | Great Britain | Feb. 11, 1926 |